(12) United States Patent
Buckwalter et al.

(10) Patent No.: US 10,977,448 B2
(45) Date of Patent: *Apr. 13, 2021

(54) DETERMINING PERSONALITY PROFILES BASED ON ONLINE SOCIAL SPEECH

(71) Applicant: Ayzenberg Group, Inc., Pasadena, CA (US)

(72) Inventors: John Galen Buckwalter, Sierra Madre, CA (US); David Hans Herman, Venice, CA (US); David Ryan Loker, Sunnyvale, CA (US); Kai Mildenberger, San Francisco, CA (US)

(73) Assignee: Ayzenberg Group, Inc., Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/507,549

(22) Filed: Jul. 10, 2019

(65) Prior Publication Data

US 2020/0026756 A1    Jan. 23, 2020

Related U.S. Application Data

(63) Continuation of application No. 15/828,256, filed on Nov. 30, 2017, now Pat. No. 10,409,915.

(51) Int. Cl.
| | |
|---|---|
| *G06F 40/30* | (2020.01) |
| *G06N 3/02* | (2006.01) |
| *G06N 20/00* | (2019.01) |
| *G06Q 50/00* | (2012.01) |
| *G06F 16/906* | (2019.01) |
| *G06F 16/9535* | (2019.01) |

(52) U.S. Cl.
CPC ............ *G06F 40/30* (2020.01); *G06F 16/906* (2019.01); *G06F 16/9535* (2019.01); *G06N 3/02* (2013.01); *G06N 20/00* (2019.01); *G06Q 50/01* (2013.01)

(58) Field of Classification Search
CPC ......... G10L 15/22; G06F 40/00; G06F 16/685
See application file for complete search history.

(56) References Cited

U.S. PATENT DOCUMENTS

| | | | |
|---|---|---|---|
| 7,328,153 B2 | 2/2008 | Wells | |
| 9,564,123 B1 | 2/2017 | Mont-Reynaud | |
| 2012/0066073 A1* | 3/2012 | Dilip | G06Q 30/0269 705/14.66 |
| 2016/0170969 A1* | 6/2016 | Allen | G06F 16/4393 704/9 |
| 2016/0350801 A1 | 12/2016 | Vincent | |
| 2017/0018030 A1* | 1/2017 | Crouspeyre | G06Q 50/01 |

* cited by examiner

*Primary Examiner* — Daniel Abebe

(74) *Attorney, Agent, or Firm* — Van Pelt, Yi & James LLP

(57) ABSTRACT

A method for determining a personality profile of an online user is disclosed. Social speech content data associated with an online user is stored. A machine learning model is used to determine a first personality profile of the online user based at least in part on the social speech content data associated with the online user. A second personality profile of the online user is determined based on the social speech content data using a scientific personality model encoded in an ontology, wherein the ontology encodes statistical relationships between a plurality of words and a plurality of personality traits based on one or more scientific research studies. An ensemble model is applied to determine a third personality profile of the online user based at least in part on the first personality profile and the second personality profile.

21 Claims, 9 Drawing Sheets

Question 1

1-3

How strongly do these pairs of personality traits describe you?
Use the scales to rate where you fall between the traits on each line.

| | |
|---|---|
| Extroverted, enthusiastic | Reserved, quiet |

| | |
|---|---|
| Critical, quarrelsome | Sympathetic, warm |

| | |
|---|---|
| Dependable, self-disciplined | Disorganized, careless |

| | |
|---|---|
| Anxious, easily upset | Calm, emotionally stable |

| | |
|---|---|
| Open to new experiences, complex | Conventional, uncreative |

| | |
|---|---|
| Tactical, self-assured | Modest, sincere |

Next

Question 2
2/3

For each word, adjust the slider to show how strongly you feel this way right now, or in the last week

Sad
Not At All — Very Much

Fearful
Not At All — Very Much

Disgusted
Not At All — Very Much

Angry
Not At All — Very Much

Surprise
Not At All — Very Much

Excitement
Not At All — Very Much

Happiness
Not At All — Very Much

Next

3/3
For each word, adjust the slider to show how strongly you feel this way right now, or in the last week

Interested
Not At All — Very Much

Distressed
Not At All — Very Much

Strong
Not At All — Very Much

Irritable
Not At All — Very Much

Ashamed
Not At All — Very Much

Inspired
Not At All — Very Much

Attentive
Not At All — Very Much

Jittery
Not At All — Very Much

Active
Not At All — Very Much

DETERMINING PERSONALITY PROFILES BASED ON ONLINE SOCIAL SPEECH

CROSS REFERENCE TO OTHER APPLICATIONS

This application is a continuation of co-pending U.S. patent application Ser. No. 15/828,256 entitled DETERMINING PERSONALITY PROFILES BASED ON ONLINE SOCIAL SPEECH filed Nov. 30, 2017 which is incorporated herein by reference for all purposes.

BACKGROUND OF THE INVENTION

Psychographic or psychometric marketing includes analyzing consumers' personalities. By understanding the personalities of different individuals, marketers may better match the individuals with brand offerings without the need to guess whether the individuals may like a product or service from a particular brand. Recently, various social media websites (e.g., Facebook, Twitter, Yelp, and LinkedIn) allow people to more easily share information about themselves. On these social media websites, people are sharing what they like, what is important to them, the values they believe in, what makes them happy, and the like. Because online social speech reveals how people think, how they express themselves, how they communicate to others, and what language or words that they tend to use, online social speech provides many new opportunities for consumer psychometric analysis and thus psychographic or psychometric marketing. Therefore, improved techniques of determining personality scores of online users based on their online social speech collected from social media platforms would be desirable.

BRIEF DESCRIPTION OF THE DRAWINGS

Various embodiments of the invention are disclosed in the following detailed description and the accompanying drawings.

FIG. 3 illustrates an example of a screenshot 300 showing that an online user is prompted by the personality evaluation application to self-rate a plurality of his/her personality traits.

FIG. 4 illustrates an example of a screenshot 400 showing that an online user is prompted by the personality evaluation application to self-rate a plurality of his/her emotional states.

FIG. 5 illustrates another example of a screenshot 500 showing that an online user is prompted by the personality evaluation application to self-rate a plurality of his/her emotional states.

DETAILED DESCRIPTION

Figure 1:
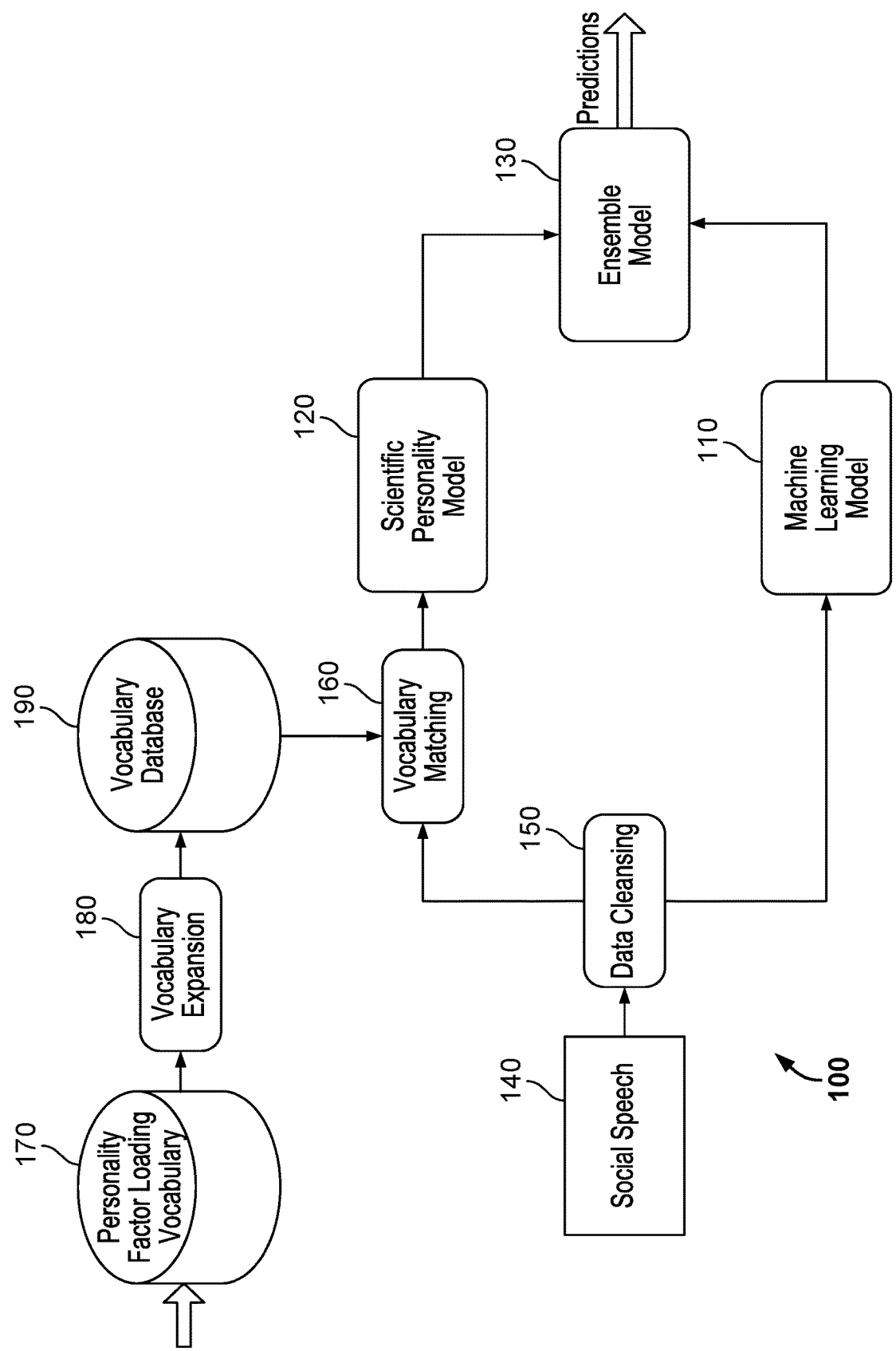
FIG. 1 is a schematic diagram showing an example of a system 100 for determining personality profiles of online users based on their online social speech.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Traditionally, companies who want to market their products rely mainly on paid media. For example, a company may place commercials on television or radio channels, printed advertisements on newspapers or magazines, signs on billboards, and the like. With the advent of the Internet, companies began to shift a large portion of their advertising effort to online paid media. For example, companies may place advertisements on search engine sites, such as Google or Yahoo!, social media sites, such as Facebook, Twitter, and LinkedIn, or online newspapers, such as the New York Times (nytimes.com) and Wall Street Journal (wsj.com).

However, online advertising faces a growing number of problems. Increasingly, consumers are showing a lack of trust in what brands are communicating on various online platforms. The recent wide spread of fake news, computer viruses, and security hackings only exacerbate the problem. As brands and agencies are able to get more detailed information on consumers and their behavior and marketing automation and social scheduling help marketers optimize how they send out messages to consumers and the best time, method, and location to reach consumers, consumers respond by using ad-blockers. For example, ad-blocking on mobile devices makes advertising to mobile phones both difficult and expensive. In addition, consumers are increasingly using time-shifted television and free content from sources that are not part of the traditional advertising machine.

Some marketers are utilizing influencer marketing. Influencer marketing is a form of marketing in which the focus is placed on influential people rather than the target market as a whole. It identifies the individuals who have influence over potential buyers, and orients marketing activities around these influencers. The premise behind why influencer marketing may be effective is that younger consumers tend to gather on social media and are inclined to trust the word of creators with whom they share interests: when an influencer endorses a particular brand, the audience who chooses to view content on the influencer's channel would treat the endorsements as authentic messages from a trusted personality. However, as more and more marketers engage in influencer marketing, the social media channels of influencers are eventually reduced to just another paid media option. Consumers realize that the influencers that they love and trust are being compensated to endorse different brands, regardless of whether the brands in question are something the influencers actually like or use, thereby causing consumers to grow suspicious of the content that they see on the influencers' channels.

Therefore, marketers need to match consumers with brand offerings more effectively. Marketers have been using market segmentation to identify high yield segments—that is, those segments that are likely to be the most profitable or have growth potential—so that these can be selected for special attention (i.e., become target markets). Many different bases for segmenting consumer markets have been identified. The different segmentation bases include demographic, geographic, geo-demographic or geoclusters, psychographics, behavioral, contextual and situational, and the like.

Psychographic or psychometric marketing includes analyzing consumers' personalities. By understanding the personalities of different individuals, marketers may better match the individuals with brand offerings without the need to guess whether the individuals may like a product or service from a particular brand. Recently, various social media websites (e.g., Facebook, Twitter, Yelp, and LinkedIn) allow people to more easily share information about themselves. On these social media websites, people are sharing what they like, what is important to them, the values they believe in, what makes them happy, and the like. Because online social speech reveals how people think, how they express themselves, how they communicate to others, and what language or words that they tend to use, online social speech provides many new opportunities for consumer psychometric analysis and thus psychographic or psychometric marketing. Therefore, improved techniques of determining personality scores of online users based on their online social speech collected from social media platforms would be desirable.

In the present application, a method for determining a personality profile of an online user is disclosed. Social speech content data associated with an online user is stored. A machine learning model is used to determine a first personality profile of the online user based at least in part on the social speech content data associated with the online user. A second personality profile of the online user is determined based on the social speech content data using a scientific personality model encoded in an ontology, wherein the ontology encodes statistical relationships between a plurality of words and a plurality of personality traits based on one or more scientific research studies. An ensemble model is applied to determine a third personality profile of the online user based at least in part on the first personality profile and the second personality profile.

FIG. 1 is a schematic diagram showing an example of a system 100 for determining personality profiles of online users based on their online social speech. System 100 includes a machine learning model 110, a scientific personality model 120, and an ensemble model 130.

Machine learning model 110 is a trained model that uses online social speech corresponding to an online user that is extracted online, e.g., from social media sites, to predict the online user's personality profile. Machine learning may be supervised, partially supervised or unsupervised.

Figure 2:
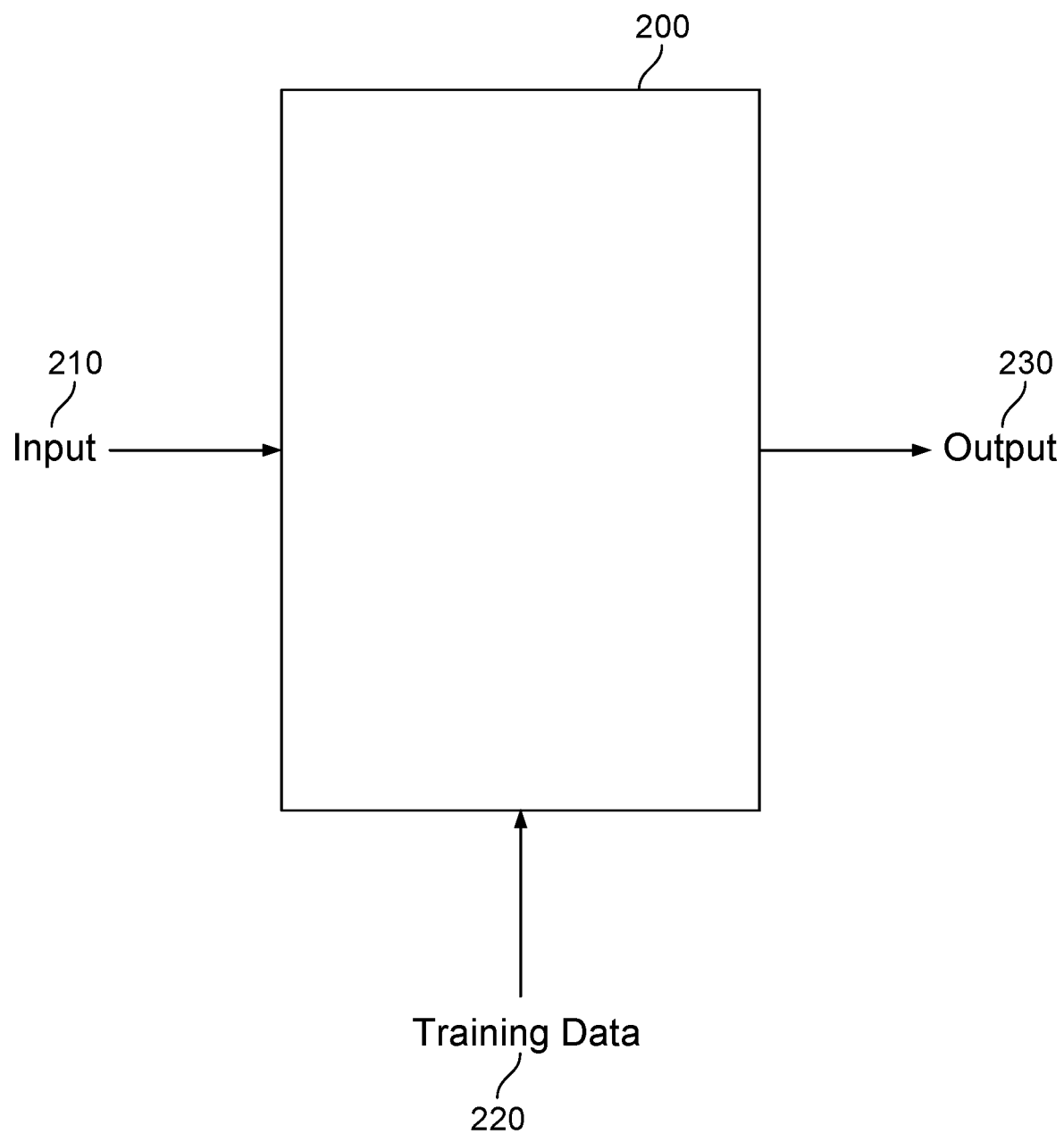
FIG. 2 is a diagram showing an example of a supervised learning model.

FIG. 2 is a diagram showing an example of a supervised learning model 200.

Supervised learning is the machine learning task of inferring a function from labeled training data. In supervised learning, the training data 220 includes a set of training examples. Each example is a pair including an input object (typically a vector) and a desired output value (also called the supervisory signal). Using supervised learning algorithms, the desired output values and the input objects are correlated to produce an inferred function, which can be used for mapping new inputs 210 to their corresponding outputs 230. In other words, after proper training, a supervised training model may use the inferred function to determine the class labels for unseen instances. For example, given a set of N training examples of the form $\{(x_1, y_1), \ldots, (x_N, y_N)\}$ such that $x_i$ is the feature vector of the $i^{th}$ input and $y_i$ is its desired output value (also referred to as its label, i.e., class), the learning algorithm determines a function g: X→Y, where X is the input space and Y is the output space. Supervised learning algorithms include support vector machines, linear regression, logistic regression, naive Bayes, linear discriminant analysis, decision trees, k-nearest neighbor algorithm, and neural networks (Multi-layer perceptron).

Referring further to FIG. 1, in some embodiments, machine learning model 110 comprises a supervised learning model. Machine learning model 110 is a supervised learning model that uses online social speech corresponding to an online user that is extracted online, e.g., from social media sites, to predict the online user's personality profile. During the training phase, labeled training data is fed into machine learning model 110 for training the model. In some embodiments, the labeled training data may be stored in a storage device. In some embodiments, the labeled training data may be obtained dynamically and sent to machine learning model 110 for periodic updating of the training model.

The training data for machine learning model 110 may be represented by a set of N training examples of the form $\{(x_1, y_1), \ldots, (x_N, y_N)\}$, where $x_i$ is the feature vector of the $i^{th}$ input example and $y_i$ is its desired output value (also referred to as its label, i.e., class). Each of the N input examples comprises a set of online social speech corresponding to a particular online user. The online social speech may be extracted from any online sites, such as social media or social networking sites. Social media sites are websites that facilitate the creation and sharing of information, ideas, career interests and other forms of expression via virtual communities and networks. Online social speech includes user-generated content, such as text posts or comments, messages, digital photos or videos, audio clips, user likes, emoji, emoticons, user clicks, data generated through online interactions, and the like. Online social speech may also include user-created user profiles. Social media sites include, but are not limited to, Facebook, YouTube, WhatsApp, Facebook Messenger, WeChat, Instagram, Twitter, Skype, Snapchat, LinkedIn, and Goodreads.

Each training example $(x_i, y_i)$ includes $x_i$ the feature vector of the $i^{th}$ input example. Each feature vector includes a set of features, wherein each of the features may be an individual measurable property or characteristic of the online social speech example associated with an online user. The feature vector may include numeric features or structural features, such as strings and graphs. In some embodiments, an online social speech input example includes images or video clips posted by a user, and one or more of the feature values in the feature vector may correspond to the pixels of the images or video clips. In some embodiments, an online social speech input example includes text shared by the user, and one or more of the features in the feature vector may include the textual terms or the frequencies of occurrence of the textual terms. In some embodiments, an online social speech input example includes audio clips (or video clips), and one or more of the features in the feature vector may include the words or phrases recognized in the audio clips (or video clips) or the frequencies of occurrence of those words or phrases. In some embodiments, an online social speech input example includes user likes, emoji, emoticons, user clicks, or other data generated through online interactions, and one or more of the features in the feature vector may include their frequencies of occurrence. These examples of feature extraction are provided for illustrative purposes only and therefore are not exhaustive or limiting. In the present application, examples are hereinafter given mainly to describe how to use the text components in online social speech corresponding to an online user to predict the online user's personality profile. These examples are provided for illustrative purposes only; those skilled in the art should recognize that similar techniques may be employed to use other components of the online social speech corresponding to an online user, e.g., digital photos or videos, audio clips, user likes, emoji, emoticons, user clicks, and data generated through online interactions, to predict the online user's personality profile.

In some embodiments, the raw data of the online social speech training input example associated with an online user is pre-processed before its corresponding feature vector is determined. The pre-processing may include data cleansing, in which the portion of the raw data that is incorrect, incomplete, improperly formatted, or duplicated is amended or removed. After the pre-processing of the raw online social speech data, a set of features is then extracted from the pre-processed online social speech data to form a feature vector representing the $i^{th}$ input example, as described above.

Each training example $(x_i, y_i)$ includes $y_i$ a desired output value corresponding to $x_i$ the feature vector of the $i^{th}$ input training example. This supervisory signal for training machine learning model 110 represents the personality or psychometric profile of the online user corresponding to the particular input training example. The personality profile may be based on any personality structure, such as the HEXACO model of personality structure, the Big Five personality traits (also known as the five factor model), and the like.

The Big Five personality model is a model based on common language descriptors of personality. The five factors have been defined as openness to experience, conscientiousness, extraversion, agreeableness, and neuroticism.

The HEXACO model of personality structure is a six-dimensional model of human personality based on findings from a series of lexical studies involving several European and Asian languages. The six factors, or dimensions, include Honesty-Humility (H), Emotionality (E), Extraversion (X), Agreeableness (A), Conscientiousness (C), and Openness to Experience (O). Each factor is composed of traits with characteristics indicating high and low levels of the factor. Each of the six broad HEXACO personality dimensions includes four sub-dimensions (facets) or narrower personality characteristics, thereby making up a total of twenty-four sub-dimensions. The four sub-dimensions of Honesty-Humility (H) include Sincerity, Fairness, Greed Avoidance, and Modesty. The four sub-dimensions of Emotionality (E) include Fearfulness, Anxiety, Dependence, and Sentimentality. The four sub-dimensions of Extraversion (X) include Social Self-Esteem, Social Boldness, Sociability, and Liveliness. The four sub-dimensions of Agreeableness (A) include Forgivingness, Gentleness, Flexibility, and Patience. The four sub-dimensions of Conscientiousness (C) include Organization, Diligence, Perfectionism, and Prudence. The four sub-dimensions of Openness to Experience (0) include Aesthetic Appreciation, Inquisitiveness, Creativity, and Unconventionality.

Using the HEXACO model or the Big Five personality model, the personality of an individual may be assessed using a self-report inventory. For example, the six dimensions or the twenty-four sub-dimensions in the HEXACO model may be measured by prompting the individual to fill out a survey or questionnaire that includes a series of questions designed to rate the individual on levels of each dimension or sub-dimension. In some embodiments, the items in the questionnaire are in the format of a Likert scale with ranked options. When responding to a Likert item, the individual specifies his/her level of agreement or disagreement on a symmetric agree-disagree scale for a series of statements. Thus, the range captures the intensity of their feelings for a given item.

In some embodiments, in order to incentivize online users to take a personality evaluation or quiz and give consent to allow system 100 to collect their online social speech as training examples for the machine learning model 110 in FIG. 1, the personality evaluation may be tied to a popular movie, television show, computer game, and the like. In one example, the personality evaluation is tied to the popular cable network show "Game of Thrones." For example, a web application on a social media site encourages online users on the social media site to take a personality evaluation, which uses the user responses to determine personality profiles (e.g., based on the HEXACO model) corresponding to the online users. The personality profile derived from the personality evaluation of an online user forms the supervisory signal (or desired output signal), $y_i$, of a training example $(x_i, y_i)$ for training machine learning model 110. The web application further prompts the online users to give consent for access to their online social speech on the social media site. The online social speech corresponding to an online user forms the input training example for training machine learning model 110. The personality profile and the online social speech corresponding to an evaluated online user together form a labeled training example for training machine learning model 110. The web application may further classify each evaluated online user as one of many characters in "Game of Thrones" who has the closest personality profile as the evaluated online user. The classification is given as a reward for taking the personality evaluation.

FIG. 3 illustrates an example of a screenshot 300 showing that an online user is prompted by the personality evaluation application to self-rate a plurality of his/her personality traits. As shown in FIG. 3, the online user is asked "How strongly do these pairs of personality traits describe you? Use the scales to rate where you fall between the traits on each line." One example of the pairs of personality traits includes "extroverted, enthusiastic" vs. "reserved, quiet." Another example of the pairs of personality traits includes "critical, quarrelsome" vs. "sympathetic, warm." Another example of the pairs of personality traits includes "dependable, self-disciplined" vs. "disorganized, careless." Another example of the pairs of personality traits includes "anxious, easily upset" vs. "calm, emotionally stable." Another example of the pairs of personality traits includes "open to new experiences, complex" vs. "conventional, uncreative." Another example of the pairs of personality traits includes "tactical, self-assured" vs. "modest, sincere."

FIG. 4 illustrates an example of a screenshot 400 showing that an online user is prompted by the personality evaluation application to self-rate a plurality of his/her emotional states. As shown in FIG. 4, the online user is asked "For each word, adjust the slider to show how strongly you feel this way right now, or in the last week." The emotional states include sad, fearful, disgusted, angry, surprised, excited, and happy.

FIG. 5 illustrates another example of a screenshot 500 showing an online user being prompted by the personality evaluation application to self-rate a plurality of his/her emotional states. As shown in FIG. 5, the online user is asked: "for each word, adjust the slider to show how strongly you feel this way right now, or in the last week." The emotional states include interested, distressed, strong, irritable, ashamed, inspired, attentive, jittery, and active.

Figure 6:
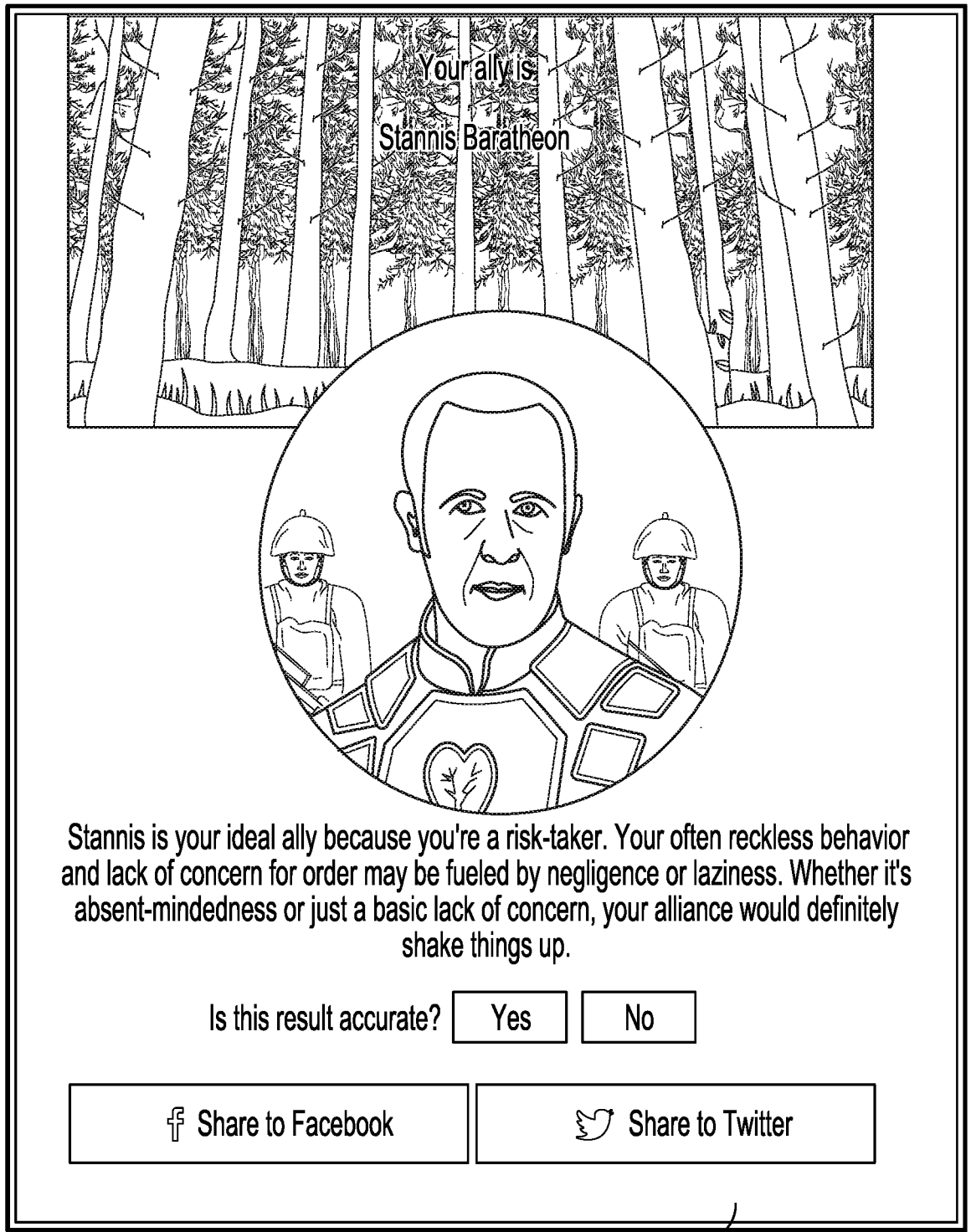
FIG. 6 illustrates an example of a screenshot 600 showing that an online user who has taken the personality evaluation is classified as an ally of the character Stannis Baratheon of "Game of Thrones."

FIG. 6 illustrates an example of a screenshot 600 showing that an online user who has taken the personality evaluation is classified as an ally of the character Stannis Baratheon of "Game of Thrones."

After proper training, machine learning model 110 may be used to predict the personality profile for a new online user. However, using machine learning model 110 alone to predict the personality profile has a number of potential issues, including bias in predicting the correct output, insufficiency of training data relative to the complexity of the inferred function, and noise in the desired output values of the training data.

To improve the prediction of personality profiles for new online users given their online social speech, system 100 as shown in FIG. 1 further includes a scientific personality model 120 that is tethered to machine learning model 110 to generate improved predictions of personality profiles for new online users given their online social speech, as will be described in greater detail below. Scientific personality model 120 encapsulates scientific knowledge that is obtained and validated through psychometric scientific research, and the scientific knowledge is used by an ensemble model 130 to calibrate machine learning model 110 (a data driven model) such that improved predictions of personality profiles for new online users based on their online social speech may be generated as an output of ensemble model 130.

Scientific personality model 120 embodies the relationships between words and personality traits that are determined by scientific research. In the field of psychology, studies have shown that the words a person writes or speaks express the person's personalities and thoughts. For example, the style of how a person writes or speaks, including how often certain words and word categories are used, reflects the person's personality traits. Therefore, scientific research studies may be conducted to determine the relationships between word usage and personality traits.

In some embodiments, scientific research studies use self-rated personality questionnaires to collect a large amount of raw data corresponding to many individuals and apply different statistical methods, e.g., factor analysis, to determine the relationships between word usage and personality traits based on the HEXACO model or Big Five model of personality structure. For example, correlations between hundreds or thousands (or more) of words and different personality factors and dimensions may be determined. In some embodiments, the words include adjectives, such as "last," "first," "happy," "same," "more," "sure," "ready," and "sad." In some embodiments, in addition to adjectives, the words include nouns and verbs. The individuals are asked to self-rate themselves on each of the words. A given word may be correlated to different personality factors or dimensions in different degrees. For example, in one research study, the word "first" is found to be strongly and positively correlated to the factor openness, while the word "last" is strongly and negatively correlated to openness. The word "popular" is found to be strongly and positively correlated to the factor extraversion, while the word "sad" is strongly and negatively correlated to extraversion. The word "sad" is strongly and positively correlated to the factor neuroticism, while the word "glad" is negatively correlated to neuroticism. Some words are neutral (i.e., neither positively or negative correlated) to certain factors.

The scientific relationships and knowledge generated from these scientific research studies may be stored in a knowledge base. In some embodiments, the representation for the knowledge base may be an object model or ontology with classes, subclasses, and instances. Ontologies are used to capture knowledge about some domain of interest. An ontology describes the concepts in the domain and also the relationships that hold between those concepts. Different ontology languages provide different facilities. For example, the Web Ontology Language (OWL) is a family of knowledge representation languages for authoring ontologies.

In some embodiments, OWL is used to encode scientific personality model 120 as an ontology. For example, the complex relationships found between word usage and personality traits based on the HEXACO model of personality structure that are obtained from a scientific research study may be encoded into an ontology using OWL. Relationships between hundreds or thousands (or more) of words and the relationships between the words and different personality factors and dimensions may be encoded into the ontology. For example, the degree of correlation between a given word and a specific personality factor or dimension (also referred to as a factor loading) may be represented in a scale between −N and +N, where −N is the most negative correlation, 0 is neutral or no correlation, and +N is the most positive correlation. In some embodiments, the ontology organizes the information in a consistent manner such that a factor (or trait) is linked to the words with graph edge weights indicating the degree of correlation between the factor (or trait) and the words. In some embodiments, the ontology organizes the information such that a factor is linked to words that express the factor strongly. Similarly, the ontology may organize the information such that a word is linked to factors that are expressed strongly by the word.

Figure 7:
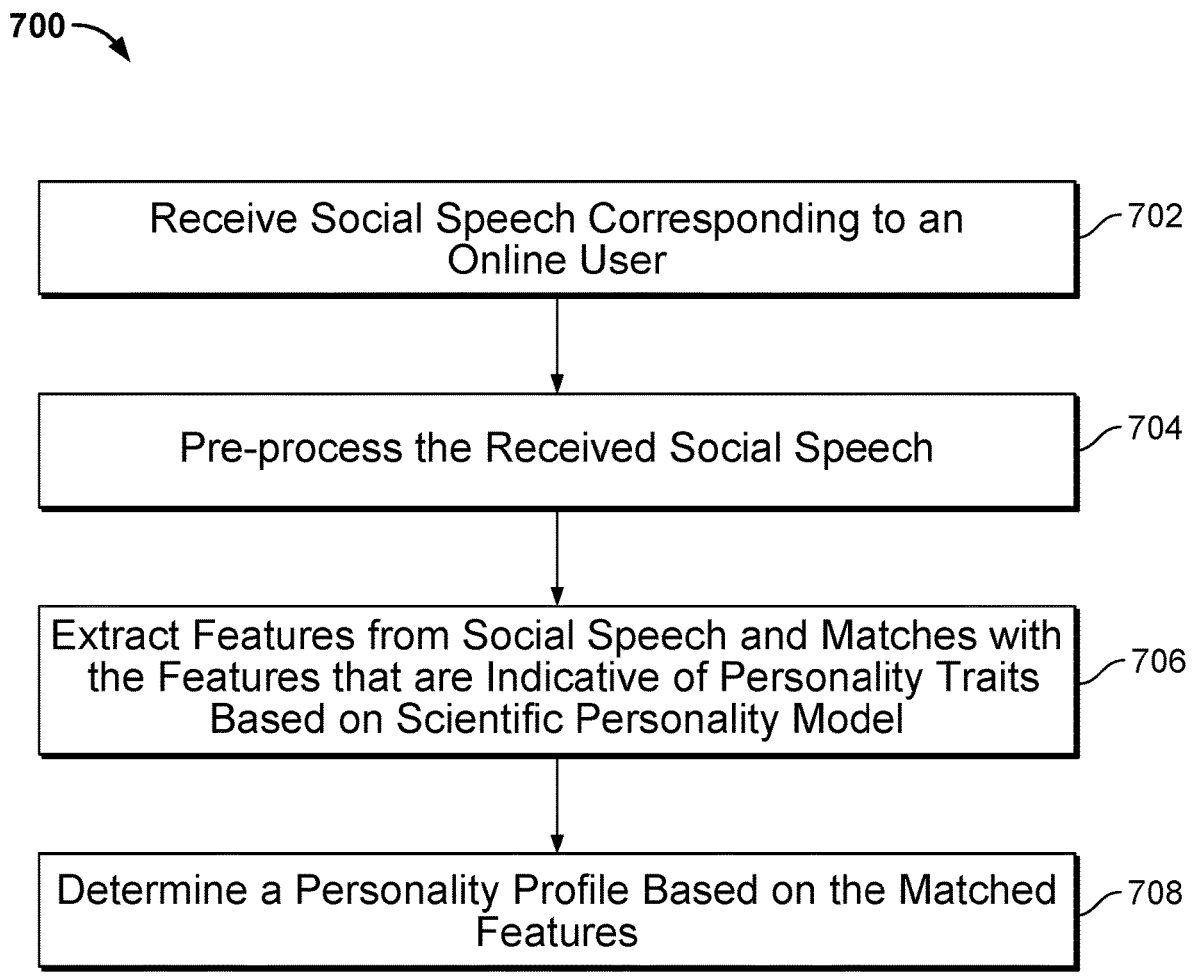
FIG. 7 illustrates an example of a process 700 for using a scientific personality model to predict an online user's personality profile based on online social speech corresponding to the online user.

Scientific personality model 120 can use online social speech corresponding to an online user that are extracted online, e.g., from social media sites, to predict the online user's personality profile. FIG. 7 illustrates an example of a process 700 for using a scientific personality model to predict an online user's personality profile based on online social speech corresponding to the online user. In some embodiments, process 700 is performed by some of the components in system 100 of FIG. 1.

At 702, online social speech 140 corresponding to an online user is received. The online social speech may be extracted from any online sites, such as social media or social networking sites as described above. In some embodiments, the online social speech may be collected the same way as the online social speech is collected for training machine learning model 110 as described above.

At 704, the received online social speech 140 is pre-processed. Pre-processing may include data cleansing, in which the portion of the raw online social speech data that is incorrect, incomplete, improperly formatted, or duplicated is amended or removed by data cleansing module 150.

At 706, features of the pre-processed online social speech are extracted and matched with features that are indicative of personality traits based on scientific personality model 120. In some embodiments, the features that are useful for determining personality traits based on scientific personality model 120 include a collection of words (vocabulary). However, scientific personality model 120 may use other types of features for determining personality traits as well. The collection of words is stored in a storage device or vocabulary database 190, and the feature matching is performed by a vocabulary matching module 160.

In some embodiments, a vocabulary expansion module 180 takes the collection of words that already have their relationships with respect to personality traits encoded into scientific personality model 120 and adds additional words to the collection to form an expanded collection of matching words that are then stored in vocabulary database 190. The words that have their relationships with respect to personality traits encoded into scientific personality model 120 are hereinafter referred to as the personality factor loading words, and these words may be stored in a personality factor loading vocabulary database 170. These are the words that have their factor loadings encoded into scientific personality model 120. The words expanded from the factor loading words are hereinafter referred to as the expanded personality factor loading words.

Expanding the collection of words by vocabulary expansion module 180 increases the number of features that can be extracted from the online social speech and matched with features that are indicative of personality traits based on scientific personality model 120. As described above, relationships between hundreds or thousands (or more) of words and the relationships between these words and different personality factors and dimensions are encoded into scientific personality model 120. For example, the words in scientific personality model 120 include words such as "hate," "love," "cool," "healthy," or "nice," which are useful in predicting certain aspects of personality scores. Although scientific personality model 120 may include a large number of words, the online social speech corresponding to the online user may include words that are not exact matches to those words. For example, the words included in scientific personality model 120 may be words that are used in more traditional or formal speeches or writings, whereas the online social speech of the online user may include informal or colloquial language, such as slang, jargon, abbreviations, acronyms, and the like. Therefore, in order to match more words in online social speech onto words in scientific personality model 120, a greater list of words is generated based on the list of words that are already included in scientific personality model 120.

In some embodiments, in addition to the personality factor loading words, vocabulary database 190 further includes their synonyms as the expanded words. In some embodiments, vocabulary database 190 further includes words that are similar to the personality factor loading words. For example, the word "like" is similar to "love," but the two words are not exactly synonyms of each other. In another example, the words "cool" and "awesome" have similar but not exactly the same meaning. Metadata for each expanded word may be stored in vocabulary database 190. For example, for each expanded word, its corresponding personality factor loading word it originates from may be stored as metadata. In addition, for each expanded word, a similarity score indicating how close in meaning between the expanded word and the corresponding personality factor loading word it originates from may be stored in vocabulary database 190. For example, the similarity score may have a scale between 0 and 1, with 1 being the closest in meaning and 0 being the most different in meaning.

In some embodiments, vocabulary expansion module 180 includes a trained word2vec model. Word2vec is a group of related models that are used to produce word embeddings. These models are shallow, two-layer neural networks that are trained to reconstruct linguistic contexts of words. Word2vec takes as its input a large corpus of text (e.g., from Wikipedia) and produces a vector space, typically of several hundred dimensions, with each unique word in the corpus being assigned a corresponding vector in the space. Word vectors are positioned in the vector space such that words that share common contexts in the corpus are located in close proximity to one another in the space. For example, given a personality factor loading word, a cluster of words, each with their word vectors surrounding the factor loading word in vector space and having a similarity score above a certain threshold, may be selected to be added as an expanded personality factor loading word and stored in vocabulary database 190 for matching the words found in online social speech. For example, only words that have a similarity score above 0.9 may be selected to be added into vocabulary database 190 as expanded personality factor loading words.

Referring back to step 706 of process 700, words in the pre-processed online social speech are extracted and matched with the words in vocabulary database 190. The list of matched words may include personality factor loading words, expanded personality factor loading words, or both.

At step 708, a personality profile is generated based on the list of matched words determined at step 706. If a matched word is a personality factor loading word, its associated score assigned to each of the personality factors or dimensions may be determined by tracing the graph edges with factor loadings in scientific personality model 120. If a matched word is an expanded factor loading word, its associated score assigned to each of the personality factors or dimensions is based on the factor loading word that the expanded word originates from and the similarity score between the two words. First, the scores corresponding to the factor loading word is determined as described above, and then the scores are further scaled by the similarity score between the two words. The scores for each matched word are then aggregated to form the personality profile that includes a total score for each personality trait.

Referring back to FIG. 1, the personality profile predicted by scientific personality model 120 is then used by an ensemble learning model 130 to calibrate or correct the personality profile predicted by machine learning model 110 (a data driven model) such that an improved personality profile for a new online user based on his/her online social speech may be generated as an output from ensemble learning model 130. It should be recognized that traditional ensemble methods use multiple learning algorithms to obtain better predictive performance than could be obtained from any of the constituent learning algorithms alone. In contrast, ensemble learning model 130 is tethering a data driven machine learning model with a scientific personality model, as opposed to another machine learning model. Tethering a data driven machine learning model with a scientific personality model is novel and advantageous. The scientific personality model serves as a "true north" for calibrating machine learning model 110, thereby allowing ensemble model 130 to make predictions significantly more efficiently and accurately than by combining multiple learning models together.

Figure 8:
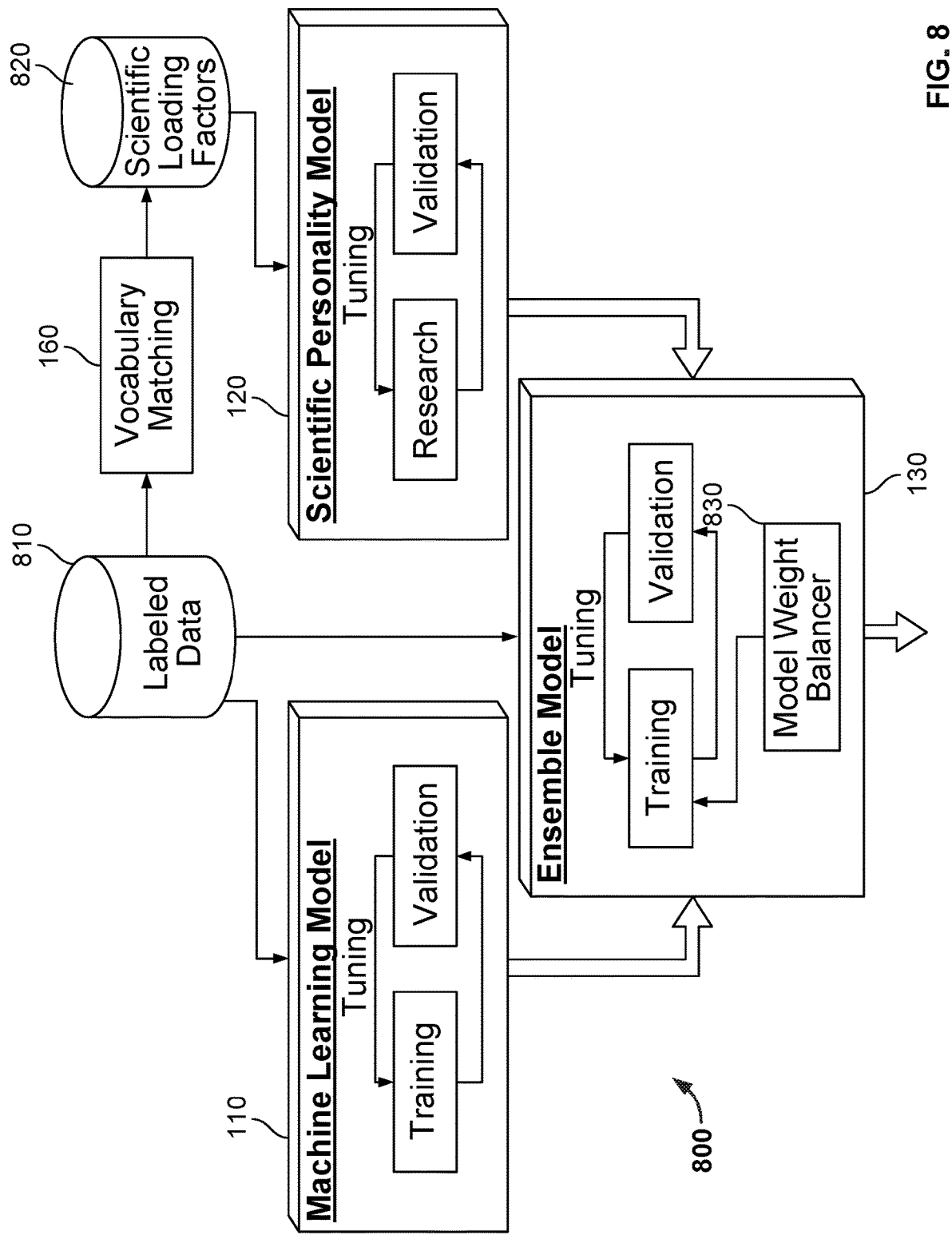
FIG. 8 is a schematic diagram showing an example of a system 800 for training ensemble model 130 to use a personality profile predicted by scientific personality model 120 to calibrate a personality profile predicted by a trained machine learning model 110, such that an improved personality profile for a new online user based on his/her online social speech may be generated as an output from the trained ensemble learning model 130.

FIG. 8 is a schematic diagram showing an example of a system 800 for training ensemble model 130 to use a personality profile predicted by scientific personality model 120 to calibrate a personality profile predicted by a trained machine learning model 110, such that an improved personality profile for a new online user based on his/her online social speech may be generated as an output from the trained ensemble learning model 130. System 800 of FIG. 8 comprises a number of components which are common with system 100 of FIG. 1 and have been denoted using the same reference numerals.

Figure 9:
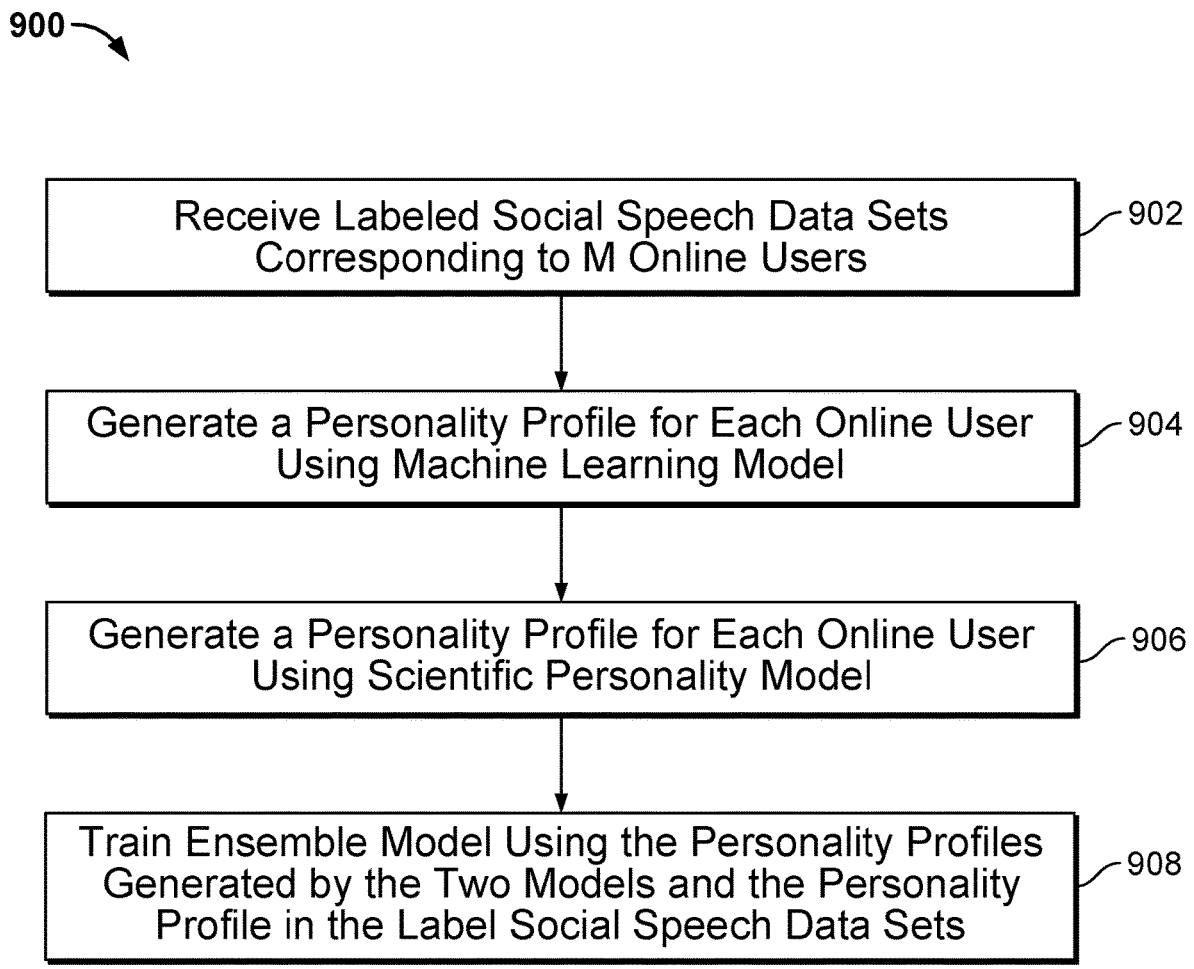
FIG. 9 illustrates an example of a process 900 for training ensemble model 130 to use a personality profile predicted by scientific personality model 120 to calibrate a personality profile predicted by machine learning model 110.

FIG. 9 illustrates an example of a process 900 for training ensemble model 130 to use a personality profile predicted by scientific personality model 120 to calibrate a personality profile predicted by machine learning model 110. In some embodiments, process 900 is performed by system 800 of FIG. 8.

At step 902, the labeled online social speech data sets corresponding to a plurality (M) of online users are received. In some embodiments, in order to reduce biases, the plurality of online users is different from the online users whose online social speech and personality scores were used for training machine learning model 110. A labeled online social speech data set corresponding to an online user includes the online social speech corresponding to the online user and the user's personality profile. The online social speech may be extracted from any online sites, such as social media or social networking sites as described above. In some embodiments, the online social speech may be collected the same way as the online social speech is collected for training machine learning model 110 as described above. The personality profile may be based on any personality structure, such as the HEXACO model of personality structure, the Big Five personality traits, and the like. In some embodiments, the personality profiles may be determined the same way as the personality profiles are determined for training machine learning model 110 as described above. For example, the personality profiles are obtained from a personality evaluation that is tied to a popular television show, as described above. In some embodiments, the labeled online social speech data sets may be stored in a storage device 810. In some embodiments, the labeled online social speech data sets may be obtained dynamically and sent to system 800 for updating ensemble model 130.

At step 904, the personality profile of each of the plurality of online users is generated by the trained machine learning model 110 based on the online user's online social speech in the labeled online social speech data set corresponding to the online user.

At step 906, the personality profile of each of the plurality of online users is generated by scientific learning model 120 based on the online user's online social speech in the labeled online social speech data set corresponding to the online user. In some embodiments, process 700 of FIG. 7 is used to generate the personality profiles based on scientific personality model 120.

At step 908, the personality profiles generated by machine learning model 110 at step 904, the personality profiles generated by scientific learning model 120 at step 906, and the personality profiles in the labeled online social speech data sets received at step 902 are used for training ensemble model 130.

In some embodiments, ensemble model 130 is a supervised learning model. The training data for ensemble model 130 includes a set of training examples. Each example is a pair including an input object and a desired output value (also called the supervisory signal). Using supervised learning algorithms, the desired output values and the input objects are correlated to produce an inferred function, which can be used for mapping new inputs to their corresponding outputs. For example, given a set of M training examples of the form $\{(x_1, y_1), \ldots, (x_M, y_M)\}$ such that $x_i$ is the feature vector of the $i^{th}$ input and $y_i$ is its desired output value (also referred to as its label, i.e., class), the learning algorithm determines a function g: X→Y, where X is the input space and Y is the output space. Supervised learning algorithms include support vector machines, linear regression, logistic regression, naive Bayes, linear discriminant analysis, decision trees, k-nearest neighbor algorithm, and neural networks (Multilayer perceptron).

The $i^{th}$ training input for ensemble model 130 includes the $i^{th}$ personality profile generated by machine learning model 110 corresponding to the $i^{th}$ online user and also the $i^{th}$ personality profile generated by scientific learning model 120 corresponding to the $i^{th}$ online user. The desired output value, $y_i$, for training ensemble model 130 is the $i^{th}$ personality profile in the labeled online social speech data sets.

Ensemble model 130 learns from the training examples on how to combine machine learning model 110 and scientific learning model 120 to give an optimized personality profile of an online user based on the online user's online social speech. In some embodiments, the inferred function for mapping new inputs to their corresponding outputs is a linear function. For example, the inferred function is a weighted combination of the predicted output from machine learning model 110 and the predicted output from scientific personality model 120.

$$\text{Function} = w_1 * \text{output from machine learning model} + w_2 * \text{output from scientific personality model}$$

In some embodiments, a model weight balancer is used to shift more weight to scientific personality model 120 and less weight to machine learning model 110 when there is not enough online social speech data from a user for making a reliable prediction.

Techniques disclosed herein in various embodiments enable personality traits of an online user to be determined based on the user's social speech, e.g., by combining an ontology-based analysis of the user's social speech with a machine learning model-based analysis to produce an assessment of the user's personality that is more reliable than either approach alone may have produced.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a memory configured to store social speech content data associated with an online user; and
a processor coupled to the memory and configured to:
use a machine learning model to determine based at least in part on the social speech content data associated with the online user a first personality profile of the online user;
determine a second personality profile of the online user based on the social speech content data using a scientific personality model encoded in an ontology, wherein the ontology encodes statistical relationships between a plurality of words and a plurality of personality traits based on one or more scientific research studies, wherein a scientific research study comprises a study that uses questionnaires to collect statistical data; and
apply an ensemble model to determine a third personality profile of the online user based at least in part on the first personality profile and the second personality profile.

2. The system of claim 1, wherein the processor is further configured to:
train the machine learning model using a plurality of training examples for the machine learning model, wherein each training example for the machine learning model corresponds to a single online user and is collected from an online social media website, and wherein each training example for the machine learning model comprises an input example and an associated output value, and wherein the input example comprises a set of online social speech content data corresponding to the single online user, and wherein the associated output value comprises a personality profile of the single online user determined by a personality evaluation comprising a self-rated personality questionnaire;
obtain a consent from the single online user for access to the set of online social speech content data corresponding to the single online user on the online social media website; and
perform the personality evaluation.

3. The system of claim 1, wherein encoding the statistical relationships between the plurality of words and the plurality of personality traits based on one or more scientific research studies comprises:
linking a personality trait to a word via graph edges, wherein each graph edge comprises a graph edge weight indicating a degree of correlation between the personality trait and the word.

4. The system of claim 3, wherein determining a second personality profile of the online user further comprises:
expanding the plurality of words into a collection of matching words, wherein the collection of matching words comprises the plurality of words and expanded words, wherein each expanded word originates from one of the plurality of words, and wherein each expanded word comprises a synonym of one of the plurality of words or a word with a similar meaning as one of the plurality of words.

5. The system of claim 4, wherein determining a second personality profile of the online user further comprises:

training a word2vec model with a corpus of text as an input;
producing a vector space with each unique word in the corpus of text being assigned a corresponding word vector in the vector space;
determining that a word having a vector space surrounding one of the plurality of words and having a similarity score with respect to the one of the plurality of words above a predetermined threshold; and
including the determined word as an expanded word in the collection of matching words.

6. The system of claim 4, wherein determining a second personality profile of the online user further comprises:
determining a similarity score between an expanded word and the word that the expanded word originates from.

7. The system of claim 6, wherein determining a second personality profile of the online user further comprises:
extracting words from the social speech content data and matching the extracted words against the collection of matching words to determine a list of matched words; and
determining the second personality profile based on the determined list of matched words, the similarity scores associated with the determined list of matched words, and at least some of the graph edge weights.

8. The system of claim 1, wherein the processor is further configured to:
train the ensemble model using a plurality of training examples for the ensemble model, wherein each training example for the ensemble model corresponds to a single online user, and wherein the online users corresponding to the training examples for the ensemble model are different from a plurality of online users corresponding to training examples for the machine learning model.

9. The system of claim 1, wherein the processor is further configured to:
train the ensemble model using a plurality of training examples for the ensemble model, wherein each training example for the ensemble model corresponds to a single online user, and wherein each training example for the ensemble model comprises an input example and a desired output value, and wherein the input example comprises a personality profile of the single online user determined by the machine learning model and a personality profile of the single online user determined based on the scientific personality model, and wherein the desired output value comprises a personality profile of the single online user determined by a personality evaluation comprising a self-rated personality questionnaire.

10. The system of claim 9, wherein the ensemble model is trained to determine the third personality profile of the online user as a weighted combination of the first personality profile and the second personality profile.

11. A method for determining a personality profile of an online user, comprising:
storing social speech content data associated with an online user;
using a machine learning model to determine based at least in part on the social speech content data associated with the online user a first personality profile of the online user;
determining a second personality profile of the online user based on the social speech content data using a scientific personality model encoded in an ontology, wherein the ontology encodes statistical relationships between a plurality of words and a plurality of personality traits based on one or more scientific research studies, wherein a scientific research study comprises a study that uses questionnaires to collect statistical data; and applying an ensemble model to determine a third personality profile of the online user based at least in part on the first personality profile and the second personality profile.

12. The method of claim 11, further comprising:

training the machine learning model using a plurality of training examples for the machine learning model, wherein each training example for the machine learning model corresponds to a single online user and is collected from an online social media website, and wherein each training example for the machine learning model comprises an input example and an associated output value, and wherein the input example comprises a set of online social speech content data corresponding to the single online user, and wherein the associated output value comprises a personality profile of the single online user determined by a personality evaluation comprising a self-rated personality questionnaire;

obtaining a consent from the single online user for access to the set of online social speech content data corresponding to the single online user on the online social media website; and performing the personality evaluation.

13. The method of claim 11, wherein encoding the statistical relationships between the plurality of words and the plurality of personality traits based on one or more scientific research studies comprises:

linking a personality trait to a word via graph edges, wherein each graph edge comprises a graph edge weight indicating a degree of correlation between the personality trait and the word.

14. The method of claim 13, wherein determining a second personality profile of the online user further comprises:

expanding the plurality of words into a collection of matching words, wherein the collection of matching words comprises the plurality of words and expanded words, wherein each expanded word originates from one of the plurality of words, and wherein each expanded word comprises a synonym of one of the plurality of words or a word with a similar meaning as one of the plurality of words.

15. The method of claim 14, wherein determining a second personality profile of the online user further comprises:

training a word2vec model with a corpus of text as an input;

producing a vector space with each unique word in the corpus of text being assigned a corresponding word vector in the vector space;

determining that a word having a vector space surrounding one of the plurality of words and having a similarity score with respect to the one of the plurality of words above a predetermined threshold; and including the determined word as an expanded word in the collection of matching words.

16. The method of claim 14, wherein determining a second personality profile of the online user further comprises:

determining a similarity score between an expanded word and the word that the expanded word originates from.

17. The method of claim 16, wherein determining a second personality profile of the online user further comprises:

extracting words from the social speech content data and matching the extracted words against the collection of matching words to determine a list of matched words; and determining the second personality profile based on the determined list of matched words, the similarity scores associated with the determined list of matched words, and at least some of the graph edge weights.

18. The method of claim 11, further comprising:

training the ensemble model using a plurality of training examples for the ensemble model, wherein each training example for the ensemble model corresponds to a single online user, and wherein the online users corresponding to the training examples for the ensemble model are different from a plurality of online users corresponding to training examples for the machine learning model.

19. The method of claim 11, further comprising:

training the ensemble model using a plurality of training examples for the ensemble model, wherein each training example for the ensemble model corresponds to a single online user, and wherein each training example for the ensemble model comprises an input example and a desired output value, and wherein the input example comprises a personality profile of the single online user determined by the machine learning model and a personality profile of the single online user determined based on the scientific personality model, and wherein the desired output value comprises a personality profile of the single online user determined by a personality evaluation comprising a self-rated personality questionnaire.

20. The method of claim 19, wherein the ensemble model is trained to determine the third personality profile of the online user as a weighted combination of the first personality profile and the second personality profile.

21. A computer program product for determining a personality profile of an online user, the computer program product being embodied in a tangible computer readable storage medium and comprising computer instructions for:

storing social speech content data associated with an online user;

using a machine learning model to determine based at least in part on the social speech content data associated with the online user a first personality profile of the online user;

determining a second personality profile of the online user based on the social speech content data using a scientific personality model encoded in an ontology, wherein the ontology encodes statistical relationships between a plurality of words and a plurality of personality traits based on one or more scientific research studies; and applying an ensemble model to determine a third personality profile of the online user based at least in part on the first personality profile and the second personality profile.

* * * * *

UNITED STATES PATENT AND TRADEMARK OFFICE
CERTIFICATE OF CORRECTION

PATENT NO. : 10,977,448 B2  
APPLICATION NO. : 16/507549  
DATED : April 13, 2021  
INVENTOR(S) : John Galen Buckwalter et al.

Page 1 of 1

It is certified that error appears in the above-identified patent and that said Letters Patent is hereby corrected as shown below:

In the Specification

Column 8, Line 32, delete "or" and insert --nor--, therefor.

Signed and Sealed this
Twenty-first Day of June, 2022

Katherine Kelly Vidal
*Director of the United States Patent and Trademark Office*